(12) United States Patent
Prindle

(10) Patent No.: US 9,234,498 B2
(45) Date of Patent: Jan. 12, 2016

(54) HIGH EFFICIENCY WIND TURBINE

(71) Applicant: Mark Albert Prindle, Amery, WI (US)

(72) Inventor: Mark Albert Prindle, Amery, WI (US)

( * ) Notice: Subject to any disclaimer, the term of this patent is extended or adjusted under 35 U.S.C. 154(b) by 0 days.

(21) Appl. No.: 14/629,470

(22) Filed: Feb. 23, 2015

(65) Prior Publication Data
US 2015/0167631 A1     Jun. 18, 2015

Related U.S. Application Data

(62) Division of application No. 13/365,045, filed on Feb. 2, 2012, now abandoned.

(51) Int. Cl.
| | |
|---|---|
| *F03D 9/00* | (2006.01) |
| *H02P 9/04* | (2006.01) |
| *F03D 1/02* | (2006.01) |
| *H02K 7/18* | (2006.01) |
| *H02K 16/00* | (2006.01) |

(52) U.S. Cl.
CPC ............... *F03D 1/025* (2013.01); *F03D 9/002* (2013.01); *H02K 7/1838* (2013.01); *F05B 2220/7068* (2013.01); *F05B 2250/232* (2013.01); *H02K 16/005* (2013.01); *Y02E 10/725* (2013.01)

(58) Field of Classification Search
CPC .............. F03D 1/02; F03D 1/025; F03D 3/02
USPC .................................. 290/44, 54, 55
See application file for complete search history.

(56) References Cited

U.S. PATENT DOCUMENTS

| | | |
|---|---|---|
| 4,039,848 A | 8/1977 | Winderl |
| 5,506,453 A | 4/1996 | McCombs |
| 6,249,058 B1 * | 6/2001 | Rea ..................... F03D 3/065 290/44 |
| 6,476,513 B1 | 11/2002 | Gueorguiev |
| 8,026,626 B1 | 9/2011 | Meller |
| 8,070,444 B2 | 12/2011 | Clarke et al. |
| 2005/0214119 A1 | 9/2005 | Miller |
| 2006/0093482 A1 | 5/2006 | Wacinski |
| 2009/0016887 A1 | 1/2009 | Vettese et al. |
| 2009/0104039 A1 | 4/2009 | Vettese |
| 2010/0111697 A1 | 5/2010 | Wood |
| 2010/0215502 A1 | 8/2010 | Harrison |
| 2011/0140444 A1 | 6/2011 | Winter |

OTHER PUBLICATIONS

Muljadi et al., Dual-Speed Wind Turbine Generation, AWEA Windpower 1996, Denver, CO, Jun. 23-27, 1996, National Renewable Energy Labrtory, Golden Colorado, Oct. 1996.
Alan Brandon, Honewell Wind turbine is a breeze to run—and a light one at that, http://www.gizmag.com/ earthtronics-honeywell-windgate-wind-turbine/11990/, HOTTOPICS: WWDC 2011, Electric Aircraft, Jun. 17, 2009.

(Continued)

*Primary Examiner* — Tulsidas C Patel
*Assistant Examiner* — Thomas Quigley
(74) *Attorney, Agent, or Firm* — Mark A. Litman & Associates, P.A.

(57) ABSTRACT

A wind driven generator may have a first rotating element associated with a first set of vanes distributed so as to be driven by wind in a first rotational direction about an axis of rotation. A second element is associated with a second set of vanes distributed so as to be driven by the wind in a second rotational direction opposite to the first rotational direction concentric with the axis of rotation of the first rotating element. The first rotating element has magnetic elements disposed thereon that project a magnetic field towards and onto the second rotating element. The second rotating element has electromagnetic coils disposed thereon, the electromagnetic coils being exposed to the magnetic field projected from the first rotating element.

9 Claims, 3 Drawing Sheets

(56) References Cited

OTHER PUBLICATIONS

Wikipedia, DOubly fed electric machine, http://en.wikipedia.org/wiki/doubly_fed_electric_machine, Wikipedia the free encyclopedia, Printed Sep. 28, 2011.

Bhaskara Palle et al., Dynamic Integration of a Grid Connected DFIG Wind Turbine with a Fuel Cell, Golden Colorado, IEEE, 2007.

A. Perdana et al., Dynamic Response of Grid-Connected Wind Turbine with Doubly fed Induction Generator during Disturbances, Nordic Workshop on Power and Industrial Electronics, Trondheim, 2004.

* cited by examiner

HIGH EFFICIENCY WIND TURBINE

RELATED APPLICATION DATA

This Application is a continuation-in-part application under 35 U.S.C. 120 claiming priority from U.S. patent application Ser. No. 13/365,045, filed 2 Feb. 2012.

BACKGROUND OF THE INVENTION

1. Field of the Invention

The present invention relates to the field of wind turbines that use environmental air current and winds to generate electrical energy with an electrical generator.

2. Background of the Art

The wind turbine is a device that converts kinetic energy from the wind into mechanical energy. If the mechanical energy is used to produce electricity, the device may be called a wind generator or wind charger. If the mechanical energy is used to drive machinery, such as for grinding grain or pumping water, the device is called a windmill or wind pump. Developed for over a millennium, today's wind turbines are manufactured in a range of vertical and horizontal axis types. The smallest turbines are used for applications such as battery charging or auxiliary power on sailing boats; while large grid-connected arrays of turbines are becoming an increasingly large source of commercial electric power. Wind turbines can rotate about either a horizontal or a vertical axis, the former being both older and more common horizontal axes.

Horizontal axis—These are defined as components of a horizontal axis wind turbine (gearbox, rotor shaft and brake assembly) after being lifted into position. Horizontal is nominally in reference to perpendicularity to gravity and/or parallelism with the horizon. Those positions are approximate, and with devices that may also shift with respect to the horizon to adjust for wind speed, that approximation may be significant.

Horizontal-axis wind turbines (HAWT) have the main rotor shaft and electrical generator at the top of a tower, and must be pointed into the wind. Small turbines are pointed by a simple wind vane, while large turbines generally use a wind sensor coupled with a servo motor. Most have a gearbox, which turns the slow rotation of the blades into a quicker rotation that is more suitable to drive an electrical generator.

Since a tower produces turbulence it, the turbine is usually positioned upwind of its supporting tower. Turbine blades are made stiff to prevent the blades from being pushed into the tower by high winds. Additionally, the blades are placed a considerable distance in front of the tower and are sometimes tilted forward into the wind a small amount.

Downwind machines have been built, despite the problem of turbulence (mast wake), because they don't need an additional mechanism for keeping them in line with the wind, and because in high winds the blades can be allowed to bend which reduces their swept area and thus their wind resistance. Since cyclical (that is repetitive) turbulence may lead to fatigue failures, most HAWTs are of upwind design.

Turbines used in wind farms for commercial production of electric power are usually three-bladed and pointed into the wind by computer-controlled motors. These have high tip speeds of over 320 kilometers per hour (200 mph), high efficiency, and low torque ripple, which contribute to good reliability. The blades are usually colored light gray to blend in with the clouds and range in length from 20 to 40 meters (66 to 130 ft) or more. The tubular steel towers range from 60 to 90 meters (200 to 300 ft) tall. The blades rotate at 10-22 revolutions per minute. At 22 rotations per minute the tip speed exceeds 300 feet per second (91 m/s). A gear box is commonly used for stepping up the speed of the generator, although designs may also use direct drive of an annular generator. Some models operate at constant speed, but more energy can be collected by variable-speed turbines which use a solid-state power converter to interface to the transmission system. All turbines are equipped with protective features to avoid damage at high wind speeds, by feathering the blades into the wind which ceases their rotation, supplemented by brakes.

Wind turbines are designed to exploit the wind energy that exists at a location. Aerodynamic modeling is used to determine the optimum tower height, control systems, number of blades and blade shape. Wind turbines convert wind energy to electricity for distribution and typically are not combined with any storage capability. Conventional horizontal axis turbines can be divided into three components.

- The rotor component, which is approximately 20% of the wind turbine cost, includes the blades for converting wind energy to low speed rotational energy.
- The generator component, which is approximately 34% of the wind turbine cost, includes the electrical generator, the control electronics, and most likely a gearbox (e.g., planetary gearbox, adjustable-speed drive or continuously variable transmission) component for converting the low speed incoming rotation to high speed rotation suitable for generating electricity.
- The structural support component, which is approximately 15% of the wind turbine cost, includes the tower and rotor yaw mechanism.

A 1.5 MW wind turbine of a type frequently seen in the United States has a tower 80 meters high. The rotor assembly (blades and hub) weighs 48,000 pounds (22,000 kg). The nacelle, which contains the generator component, weighs 115,000 pounds (52,000 kg). The concrete base for the tower is constructed using 58,000 pounds (26,000 kg) of reinforcing steel and contains 250 cubic yards (190 cubic meters) of concrete. The base is 50 feet (15 m) in diameter and 8 feet (2.4 m) thick near the center.

Above 10 m/s, where power regulation caused blade coning, the early data recorded was erratic and use of these figures would distort further data processing. A cut off point was set at 3500 seconds and the readings taken before this point were not used for the detailed calculations. As the wind speed during the day did not fall below 6 m/s, and regulation cut in at 10 m/s, the final results were based on a narrow band of rotor speeds between 3.1 and 4.4 rev/s The universal standard to assess the performance of a wind turbine is a plot of the Power Coefficient versus the Tip Speed Ratio performance curve. This curve tells you how efficiently a turbine converts the energy in the wind to electricity. Various methods were used to plot this curve. The results are show in Figure.

FIG. 1: Power Coefficients Versus Tip Speed Ratio

As a result of conventional energy sources consumption and increasing environmental concern, efforts have been made to generate electricity from renewable sources, such as wind energy sources. Institutional support on wind energy sources, together with the wind energy potential and improvement of wind energy conversion technology, has led to a fast development of wind power generation in recent years. Other reasons could be the fuel price but especially environmental demands. The wind generation does not pollute the surrounding areas and also does not produce waste products. To get the maximum possible power, the wind generator speed should change according to the wind speed.

Generally the wind turbines (WTs) can either operate at fixed speed or variable speed. For a fixed speed wind turbine the generator is directly connected to the electrical grid. The rotor speed of the fixed-speed wind turbine is in principle determined by a gearbox and the pole-pair number of the generator. An impediment of the fixed speed wind turbine is that power quality of the output power is poor. For a variable speed wind turbine equipped with a converter connected to the stator of the generator, the generator could either be a cage-bar induction generator, synchronous generator or permanent-magnet synchronous generator. There are several reasons for using variable-speed operation of wind turbines; among those are possibilities to reduce stresses of the mechanical structure, acoustic noise reduction and the possibility to control active and reactive power.

An important type of variable speed wind turbine is wind turbine with doubly-fed induction generator (WT-DFIG). This means that the stator is directly connected to the grid while the rotor winding is connected via slip rings to a back-to-back converter. Today, doubly-fed induction generators are commonly used by the wind turbine industries for larger wind turbines. The major advantage of the DFIG, which has made it popular, is that the power electronic equipment only has to handle a fraction (20-30%) of the total system power. This means that the cost of the power electronic equipment and the losses in the equipment can be reduced in comparison to power electronic equipment that has to handle the total system power as for a direct-driven synchronous generator, apart from the cost saving of using a smaller converter.

Wind Turbine with DFIG

For variable-speed systems with limited variable-speed range, e.g. ±30% of synchronous speed, the DFIG can be a cost-effective solution. The DFIG converter consists of two converters that are connected "back-to-back;" machine-side converter and grid-side converter. Between the converters a dc-link capacitor is placed, as energy storage to keep the dc-link voltage variations (or ripple) small. With the machine-side converter it is possible to control the torque or the speed of the DFIG and also the power factor at the stator terminals, while the main objective for the grid-side converter is to keep the dc-link voltage constant. The DFIG can operate both in motor and generator operation with a rotor-speed range of ±Δωr max around the synchronous speed, ω1.

2.1 WT-DFIG Model Description

The complete model of a WT-DFIG is constructed from a number of sub models, i.e. a) turbine, b) drive train, c) pitch controller, d) wound-rotor induction generator, e) rotor-side converters.

A) Turbine Model

One common way to control the active power of a wind turbine is by regulating the cp value of the rotor turbine. In the model, the cp value of the turbine rotor is approximated using a non-linear function according to $$P_{mech} = \frac{1}{2}\rho A_r C_p(\lambda, \beta)\omega wind3, \quad = \frac{\omega_r r_r}{\omega_{wind}}$$

Where Cp is the power coefficient, β is the pitch angle, λ is the tip speed ratio, $\omega_{wind}$ is the wind speed, $\omega_r$ is the rotor speed, $r_r$ is the rotor-plane radius, ρ is the air density and $A_r$ is the area swept by the rotor.

B) Drive-Train Model

When investigating dynamic stability, it is important to include the drive-train system of a wind turbine in the model. Its model consists of two main masses; the turbine mass and generator mass. These are connected to each other via a shaft that has certain stiffness and damping constant values.

$$2H_t\frac{d\omega_t}{d_t} = T_t - KS\Theta tg - D_{S^*}(\omega_t - \omega_g)$$

$$2H_g\frac{\omega_t}{d_t} = Tg + KS\Theta tg - D_{S^*}(\omega_t - \omega_g)$$

$$\frac{d\Theta g}{d_t} = Tg + \omega_{base}D_{S^*}(\omega_t - \omega_g)$$

Where H is the inertia constant, T is torque and ω is angular speed. Subscripts g and t indicate the generator and turbine quantities, respectively. The shaft stiffness and damping constant value are represented in $K_S$ and $D_S$, $\omega_{base}$ is in the base value of angular speed.

C) Pitch Controller Model

According to the below Equation, the cp value can be reduced by increasing the pitch angle β. However, the pitch angle is not able to reach the set point value immediately.

$$C_p(\lambda, \beta) = 0.22\left(\frac{116}{\lambda} - 0.4\beta - 5\right)$$

Accordingly, for a more realistic simulation, a rate limiter is implemented in the pitch controller model. The pitch-angle controller block diagram is employed to limit the rotor speed. For this reason, the pitch-angle controller is active only during high average wind speed.

Pitch controller diagram.

D) Generator Model

The generator is basically a slip-ring induction machine, which can be modeled according to by the following equations.

$$u_s = rs \cdot i_s + d/dt(\psi_S) + (\omega_a - \omega_s)\psi_S \quad (7)$$

$$u_r = r_r \cdot i_r + d/dt(\psi_r) + (\omega_a - \omega_r)\psi_r \quad (8)$$

where u, i and ψ are vectors of voltage, current and flux those are functions of time, and R is the resistance. Subscripts s and r denote the stator and rotor quantities. The speed of the rotor is denoted by ωr. The equations are given in an arbitrary reference frame, which rotates at arbitrary speed of ωa. The flux and current relations are given as $$\psi_S = (L_{sl} + L_m)i_s + L_m i_s \quad (9)$$

$$\psi_r = (L_{rl} + L_m)i_r + L_m i_r \quad (10)$$

where Lm is the mutual inductance and Lsl and Lrl are the stator
and rotor leakage inductances, respectively.

E) The Rotor Side Converters Controller Model

The rotor side converter is modeled as a voltage source type. For simplification, switching phenomena and dynamic limitations in the converter are neglected by assuming that switching frequency is infinite. The purpose of the controller is to regulate the active and reactive power output independently. To decouple these two parameters, generator quantities are calculated using vector control in a synchronous reference frame fixed to the stator flux. The controller provides set-point values of the quadrature and direct axis component of the rotor current (iqr and idr).

4.5 Harmonic Analysis

It is important to limit the levels of harmonic-current injected into power systems by wind-farm power converters to minimize the likelihood of any disturbance to the operation and sizing of grid components and other grid-connected equipment. It is advisable to aim for an overall harmonic distortion level below that specified by Std IEEE 519, for example. This paper uses the total harmonic distortion factor as a harmonic indicator. Current harmonic distortion is produced by the DFIG converters.

The harmonic distortion of the current and the voltage arises because of the switched-mode nature of the DFIG-rotor power-converters. The simulation results in FIG. 16 show that approximately 6.44% THD arises when the wind farm with DFIG is connected, so filter installation is necessary. A suitable filter is designed and installed and reduces THD to approximately 1.44%. This shows that in the event of the harmonic pollution of WT-DFIG exceeding recommended levels, filter installation is necessary and effective.

Basics of the Generator in the Wind Turbine

The two main parts of a generator or motor can be described in either mechanical or electrical terms:
Mechanical:
  Rotor: The rotating part of an electrical machine
  Stator: The stationary part of an electrical machine
Electrical:
  Armature: The power-producing component of an electrical machine. In a generator, alternator, or dynamo the armature windings generate the electric current. The armature can be on either the rotor or the stator.
  Field: The magnetic field component of an electrical machine. The magnetic field of the dynamo or alternator can be provided by either electromagnets or permanent magnets mounted on either the rotor or the stator.

Because power transferred into the field circuit is much less than in the armature circuit, AC generators nearly always have the field winding on the rotor and the stator as the armature winding. Only a small amount of field current must be transferred to the moving rotor, using slip rings. Direct current machines (dynamos) require a commutator on the rotating shaft to convert the alternating current produced by the armature to direct current, so the armature winding is on the rotor of the machine.

One simple way to think about a generator is to imagine it acting like a pump pushing water through a pipe. Only instead of pushing water, a generator uses a magnet to push electrons along. This is a slight oversimplification, but it paints a helpful picture of the properties at work in a generator. A water pump moves a certain number of water molecules and applies a certain amount of pressure to them. In the same way, the magnet in a generator pushes a certain number of electrons along and applies a certain amount of "pressure" to the electrons.

In an electrical circuit, the number of electrons in motion is called the amperage or current, and it's measured in amps. The "pressure" pushing the electrons along is called the voltage and is measured in volts. For instance, a generator spinning at 1,000 rotations per minute might produce 1 amp at 6 volts. The 1 amp is the number of electrons moving (1 amp physically means that $6.24 \times 10^{18}$ electrons move through a wire every second), and the voltage is the amount of pressure behind those electrons.

The stator is the very important electrical part of the wind turbine. It contains all the coils of wire which will have voltage induced in them as the magnets pass over them. It's defined as the 'stator' because it is the 'stationary' (it doesn't turn) part of the alternator.

In conventional electrical design jargon, one set of generator components is referred to as a stator (usually the coils, which are 'static' and do not move, hence the term "stator") and the other set of components is referred to as the rotor (usually the magnetic elements which usually rotate adjacent to the stator, and are therefore referred to as "rotors."). As further explained herein both elements rotate about a common axis, neither one is automatically a stator, as both elements are moving. For purposes of convenience, the set of coil elements (here shown as the interior rotating element 6 with coils 10 distributed thereon) will be referred to as the stator.

SUMMARY OF THE INVENTION

A wind driven generator has at least:
  a first rotating element associated with a first set of vanes distributed so as to be driven by wind in a first rotational direction, the first rotating element having an axis of rotation,
  a second element associated with a second set of vanes distributed so as to be driven the wind in a second rotational direction that is opposite to the first rotational direction, the second rotating element rotating concentrically with the axis of rotation of the first rotating element,
  the first rotating element having magnetic elements disposed thereon that project a magnetic field towards and onto the second rotating element,
  the second rotating element having electromagnetic coils disposed thereon, the electromagnetic coils being exposed to the magnetic field projected from the first rotating element, and
  at least one electrical lead connected to the second rotating element to carry current away from the second rotating element.

DETAILED DESCRIPTION OF THE INVENTION

An aspect of the present technology is to provide counter-rotation of the coils (on a first cylindrical rotating carrier) versus the magnets (on a second cylindrical rotating carrier) in a wind-driven generator, with each rotating element being driven by wind blades. By having the wind separately drive each of the independently moveable carriers, lower wind speeds create an effectively increased relative motion between the magnets and the coils, providing greater current at lower wind speeds. The ability to generate increased current at lower wind speeds is a truly significant advance in wind turbine functionality. As wind turbines reach a maximum effective level of current generation when a structural design maximum effective speed is reached or exceeded (that is, once a speed of rotation of the vanes has been reached, according to the individual design of the generator on the wind turbine, a maximum rate of current generation is provided, and increased speed does not provide any further increase in energy). Therefore, given a specific combination of magnets and coils, the ability to reach that maximum current generation at lower wind speeds is a significant technical advantage.

Figure 2:
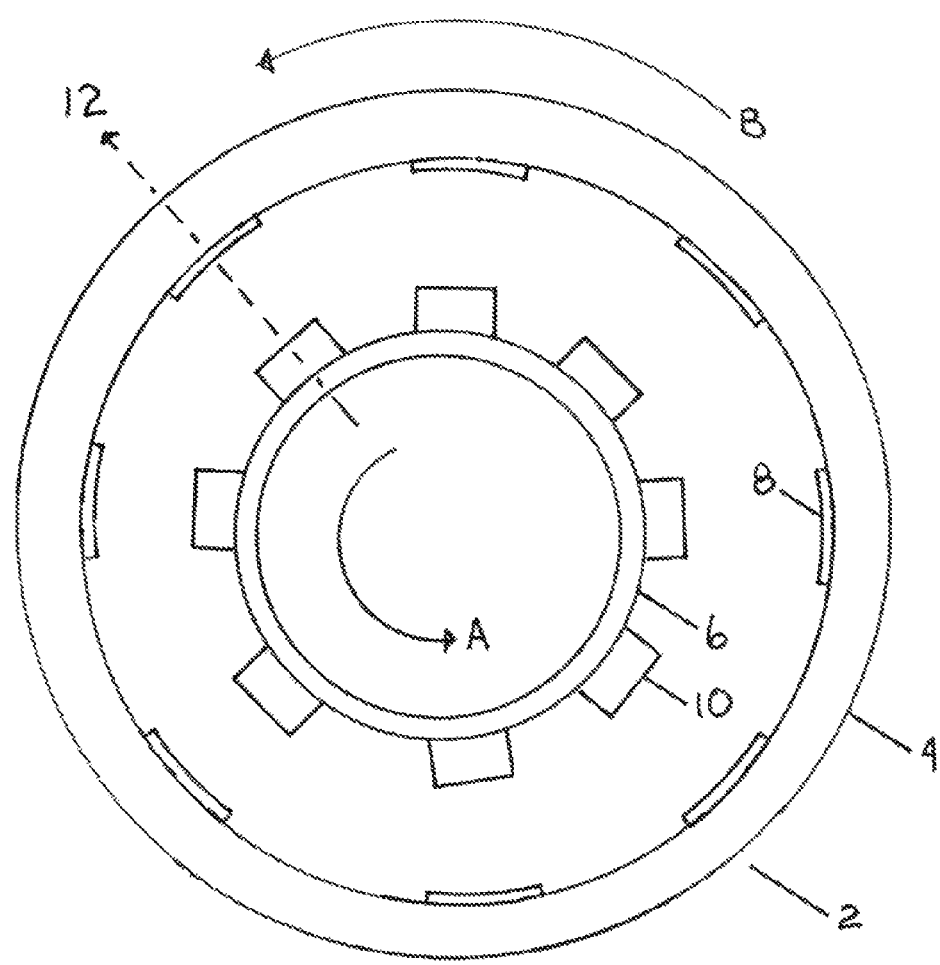
FIG. 2 shows a side view of one example of an embodiment of a wind turbine according to the present technology.

As can be seen from FIG. 2, the outer rotating element 4 has magnets 8 distributed along its interior surface, and the interior rotating element 6 has coils 8 distributed thereon, including portions that face the magnets. The outer rotating element 4 is shown to rotate in a clockwise B fashion while the interior rotating element 6 is shown to rotate in a counterclockwise A manner. In the general description provided, both the interior and exterior elements and their attachments (magnets and coils) may be reversed, as may their directions of rotation (as driven by the vanes of the blades).

Figure 1:
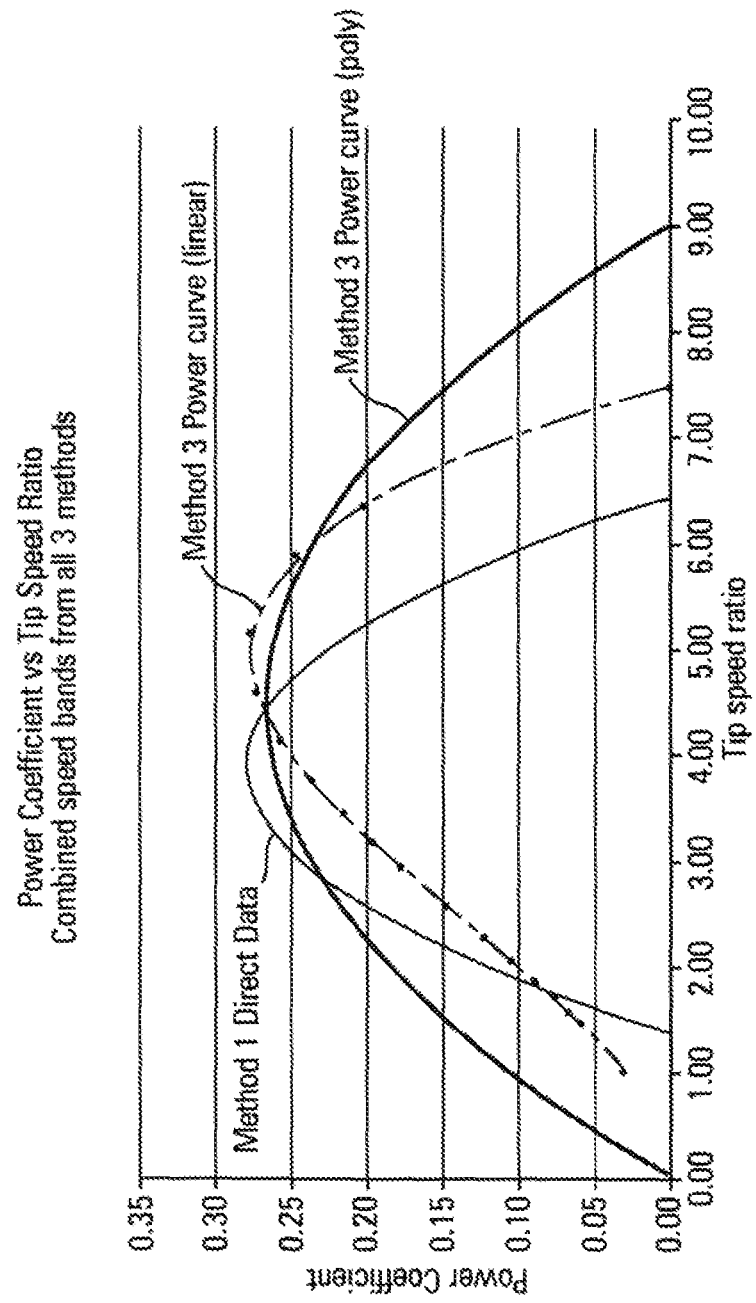
FIG. 1 shows a graphic representation of underlying performance characteristics of generators.
Figure 3:
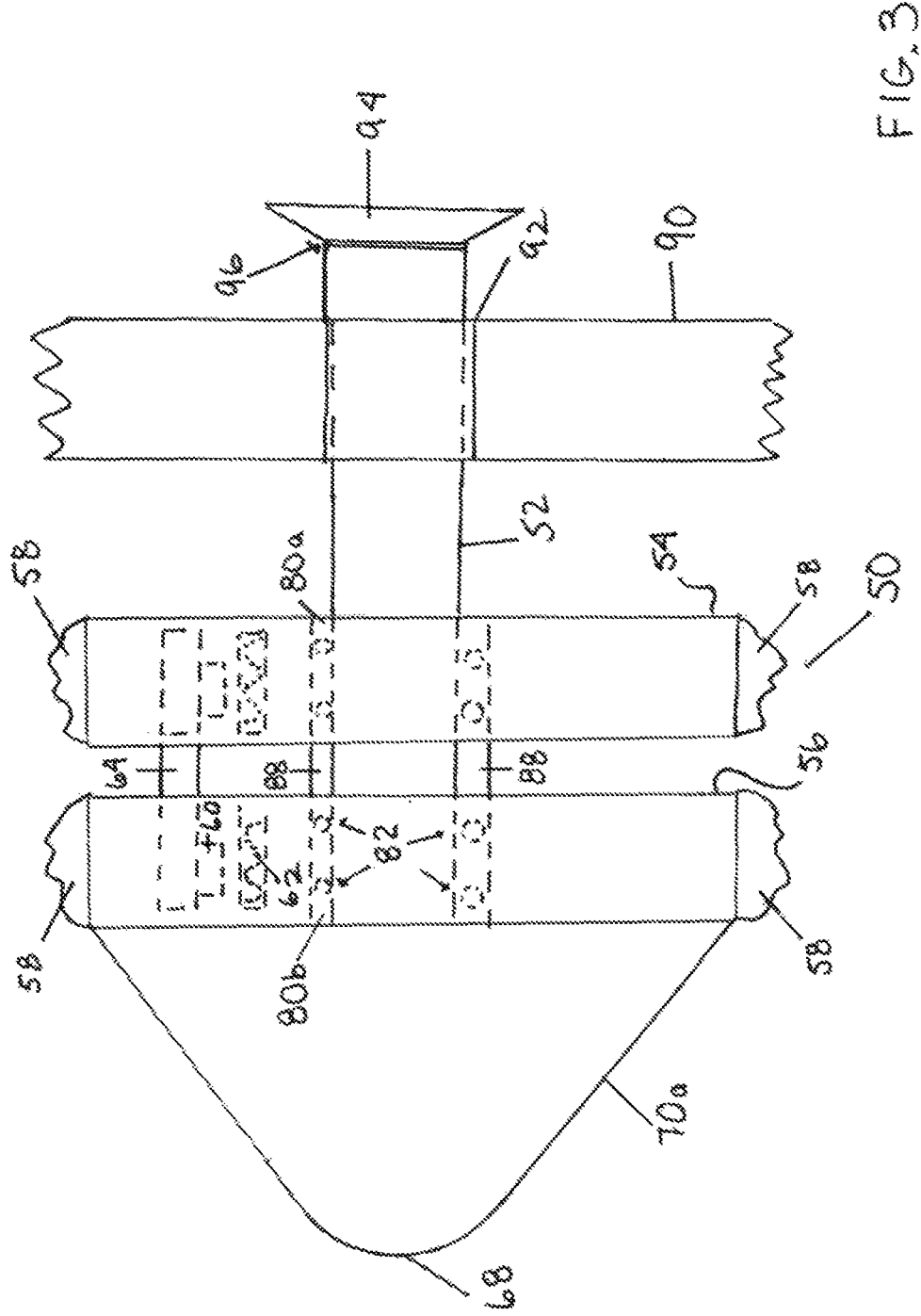
FIG. 3 shows an exploded view of one example of an embodiment of a wind turbine according to the present technology.

FIG. 3 shows a partial side view of one example of an embodiment of a wind turbine 50 according to the present technology. There is a shaft 52 that supports the two rotating cylindrical vane supports 54 and 56. Each of these vane supports 54 and 56 carries vanes 58 (shown as truncated) that extend away from the shaft 52 and are impacted by ambient wind to rotate the vane supports 54 and 56 in counter-rotating directions, as shown in FIG. 1. This counter-rotation is easily effected by having the pitch of the vanes 58 on one the respective vane supports (e.g., 54) be opposite to the pitch of the vanes 58 on the other vane support (e.g., 56). A magnet support element 64 is shown extending from the vane support 54 leeward (downwind) side of the shaft 52 across the gap 72 bridging the two vane supports 54 and 56. Cushioning spacers and low friction elements 88 are positioned between the two vane carriers 54 and 56 and are seated on the shaft 52. Each individual vane carrier 54 and 56 is supported against the shaft 52 so that it rotates with as little friction as possible. As a non-limiting example of a free-rolling support, bearings 82 are shown between the shaft and the vane carriers 54 and 56. The respective vane carriers 54 and 56 are separated from the shaft by spaces 80a and 80b. Current generated by relative movement between the magnets 60 and the coils 62 is carried along, over, through or within the shaft 52 as shown by conductive lead 74a. One non-limiting way of conducting the current from the coils 62 is by having a lead 74 at a base of the coils 62, and the lead passing current to the conductive lead 74a, as by passing is from the coil 62, across the bearings 82a, across the space 80b and into the shaft 52 to the lead 74a.

It is to be noted that in the present technology, the magnets 60 and coils 62 are in radial alignment with respect to the radial direction (12 in FIG. 2) to maximize effects.

On the windward side of the wind turbine 50 is a sloped, aerodynamic wind guide 66 with a nose 68 having a top slope 70a and a bottom slope 70b. The wind turbine 50 is supported on a post or pole (not shown) and the non-rotating shaft 52 revolved about the pole (not shown) as the wind aerodynamically repositions or redirects the wind guide 66 and thus the entire turbine. The slopes 70a and 70b may be designed to assure maximum and/or controlled flow of wind and air along the wind guide and across the vanes.

The shaft 52 extends to the vertical support post 90 (shown truncated at the top and bottom) through a rotating joint 92 that allows the wind turbine 50 to adjust to the wind. A tail section 94 is shown that pivots about pivot joint 96, allowing the tail section 94 on the leeward side of the wind turbine 50 to assist in gently aligning the nose 68 without too rapidly changing the orientation of the shaft 52.

The composition of the various parts of the wind turbines described herein are in accordance with standard techniques within the existing single rotation wind turbine technology. The vanes, blades, carriers, posts, aerodynamic wind guide and the like should be made of weather-resistant, light weight and durable materials such as metals, compositions, reinforced polymers and combinations thereof. The coils and magnets may be selected from among existing commercially available components, and optimization will be carried out to determine which components best serve various different environment conditions at different locations. One concept of the invention that is fully operative and enabled herein is:

A wind driven generator is provided. It is believed that the generator, especially at lower wind speeds and at start up speed of the generator, can exhibit higher electrical output energy or current. The wind driven generator may have:

a first rotating element associated with a first set of vanes (often referred to in the art as a blade or blades) distributed (e.g., positioned on a tower) so as to be driven by wind in a first rotational direction (e.g., clockwise or counterclockwise), the first rotating element having an axis of rotation. This axis of rotation may be free spinning, on bearings, or air bearings, lubricated, on a shaft or spindle, and the like. There is a second element associated with a second set of vanes (or blades) distributed so as to be driven the wind in a second rotational direction (e.g., counterclockwise or clockwise, respectively) that is opposite in rotational orientation to the first rotational direction, the second rotating element rotating concentrically with the axis of rotation of the first rotating element. The second rotating element may be on a distinct spindle, shaft, support, bearings etc. than the first rotating element, so that the two rotating elements operate independently. The first rotating element has magnetic elements disposed thereon that project a magnetic field towards and onto the second rotating element. These magnetic elements are consistent with and typical of the magnetic elements used in commercial generators, including wind driven generators, although the orientation within this system is novel and unobvious, as well as are the effects of that orientation. The second rotating element has electromagnetic coils disposed thereon, the electromagnetic coils being exposed to the magnetic field projected from the first rotating element. These coils are also typical coil; subcomponents that would be used in a wind driven generator or other generator. It is the combined configuration, placement and orientation with respect to the magnetic elements and the two independently rotating elements that contributes to the novelty and benefits of the technology described herein.

There is at least one electrical lead connected to the second rotating element to carry current away from the second rotating element. The produced current is created, generated and transported in normal manner by the interaction of the magnets and coils as would occur in a conventional generator, so there is little unique construction skill needed in the construction beyond the configuration of the magnets and coils. Configuring two counter-rotating components in a wind generator with opposed magnets and coils on the opposed components is one aspect of the novelty embodied in this system. The ability within the skilled artisan can make use of the known design skills of aeronautical engineers and the background art of opposed and counter-rotating blades in aircraft, even though the functional reasons for opposition are substantially different between the two systems. The underlying technology for separately supporting and allowing separate rotation of the opposed blades is useful background information. The generator may be alternatively provided where the first rotating element has the magnetic elements thereon and the second rotating element has the electromagnetic coils thereon and vice versa where the second rotating element has the magnetic elements thereon and the first rotating element has the electromagnetic coils thereon.

The generator may have an axis of rotation in moveable in at least two degrees of rotation, vertically and horizontally. The frame supporting the shaft may pivot horizontally on bearings or the like and/or may be in free-motion or motor drive. For example, a wind sensor may determine wind direction and activate a motor to position the orientation of the nose and the blades with respect to the wind direction. The axis and the frame may also be adjustable in a vertical direction o that if positioned on a hill, when the wind moves up the hill, the axis may be oriented in the direction of the wind flow. The horizontal rotation of the axis of rotation allows automatic or machine driven alignment of the axis of rotation into wind. As shown in FIG. 2, a conical nose (with rounded or pointed nose) may be positioned on a most outward rotating element, with a front, smaller dimension section of the conical element being most outward from vanes. The aerodynamic shape assures smoother wind flow towards the blades. The conical nose is fixed or moveable (to flex or adjust to the wind) with respect to a rotating support that supports the vanes.

What is claimed:

1. A wind driven generator comprising: a first rotating element associated with a first set of vanes distributed so as to be driven by wind in a first rotational direction, the first rotating element having a horizontal axis of rotation, a second rotating element associated with a second set of vanes distributed so as to be driven the wind in a second rotational direction that is opposite to the first rotational direction, the second rotating element rotating concentrically with the axis of rotation of the first rotating element, the first rotating element having magnetic elements disposed thereon that project a magnetic field towards and onto the second rotating element, the second rotating element having electromagnetic coils disposed thereon, the electromagnetic coils being exposed to the magnetic field projected from the first rotating element, and at least one electrical lead connected to the second rotating element to carry current away from the second rotating element, the first set of vanes and the second set of vanes being adjacent each other without an intervening support pole for the generator, wherein the first rotating element and the second rotating elements operate independently of each other, wherein the magnetic elements and the electromagnetic coils are radially disposed with respect to each other with respect to the axis of rotation of the first rotating element.

2. The generator of claim 1 wherein a conical nose is positioned on a most outward rotating element, with a front, smaller dimension section of the conical element being most outward from vanes.

3. The generator of claim 2 wherein the conical nose is fixed with respect to a rotating support that supports the vanes.

4. The generator of claim 1 wherein a tail element at a rearward area of the wind driven generator has a pivoting connection to a shaft supporting the first rotating element.

5. The generator of claim 4 wherein horizontal rotation of the axis of rotation allows automatic or machine driven alignment of the axis of rotation into wind and reorientation of the tail.

6. The generator of claim 1 wherein a conical nose is positioned on a most outward rotating element, with a front, smaller dimension section of the conical element being most outward from vanes, and the magnetic elements and electromagnetic coils are disposed and radially opposed from each other within the first or second rotating element.

7. The generator of claim 2 wherein the magnetic elements and electromagnetic coils are disposed and radially opposed from each other within the first or second rotating element and wherein a tail element at a rearward area of the wind driven generator has a pivoting connection to a shaft supporting the first rotating element.

8. The generator of claim 3 wherein the magnetic elements and electromagnetic coils are disposed and radially opposed from each other within the first or second rotating element and wherein a tail element at a rearward area of the wind driven generator has a pivoting connection to a shaft supporting the first rotating element.

9. The generator of claim 5 wherein a conical nose is positioned on a most outward rotating element, with a front, smaller dimension section of the conical element being most outward from vanes, and the magnetic elements and electromagnetic coils are disposed and radially opposed from each other within the first or second rotating element.

* * * * *